United States Patent
Underwood

(10) Patent No.: US 6,179,844 B1
(45) Date of Patent: Jan. 30, 2001

(54) ANIMAL TAGGING SYSTEM

(76) Inventor: Rick Underwood, 2806 Flagstone Dr., Garland, TX (US) 75044

(*) Notice: Under 35 U.S.C. 154(b), the term of this patent shall be extended for 0 days.

(21) Appl. No.: 09/420,016

(22) Filed: Oct. 18, 1999

(51) Int. Cl.$^7$ ................................................ A61B 17/00
(52) U.S. Cl. ............................ 606/117; 606/116; 119/174
(58) Field of Search ............................ 606/116, 117, 606/151; 119/174, 856; 24/327, 493, 570, 571; 40/300, 301

(56) References Cited

U.S. PATENT DOCUMENTS

| | | |
|---|---|---|
| 300,831 | 6/1884 | Atwood . |
| 1,488,351 | 3/1924 | Kilian . |
| 1,981,048 | 11/1934 | Keller ................................. 164/120 |
| 2,613,745 | 10/1952 | Wimberly ........................... 164/120 |
| 3,009,852 | * 11/1961 | Gruner ................................. 40/300 |
| 3,518,757 | 7/1970 | Grant ................................. 30/91.1 |
| 4,121,591 | * 10/1978 | Hayes ................................. 606/117 |
| 4,185,635 | * 1/1980 | Burford et al. ....................... 606/117 |
| 5,651,791 | * 7/1997 | Zavlodaver et al. ................. 606/117 |
| 6,007,547 | * 12/1999 | Ritchey ............................... 606/117 |

* cited by examiner

Primary Examiner—Pedro Philogene
(74) Attorney, Agent, or Firm—Joseph N. Breaux

(57) ABSTRACT

An animal tagging system that includes a punch assembly, a pen mechanism and a tag securing assembly. The punch assembly includes a spring biased handle assembly in connection with a set of punch jaws for punching hole through an animals ear. The handle assembly includes first and second handle ends. The pen mechanism and the tag securing assembly are storable in connection with the first and second handle ends of the handle assembly.

4 Claims, 6 Drawing Sheets

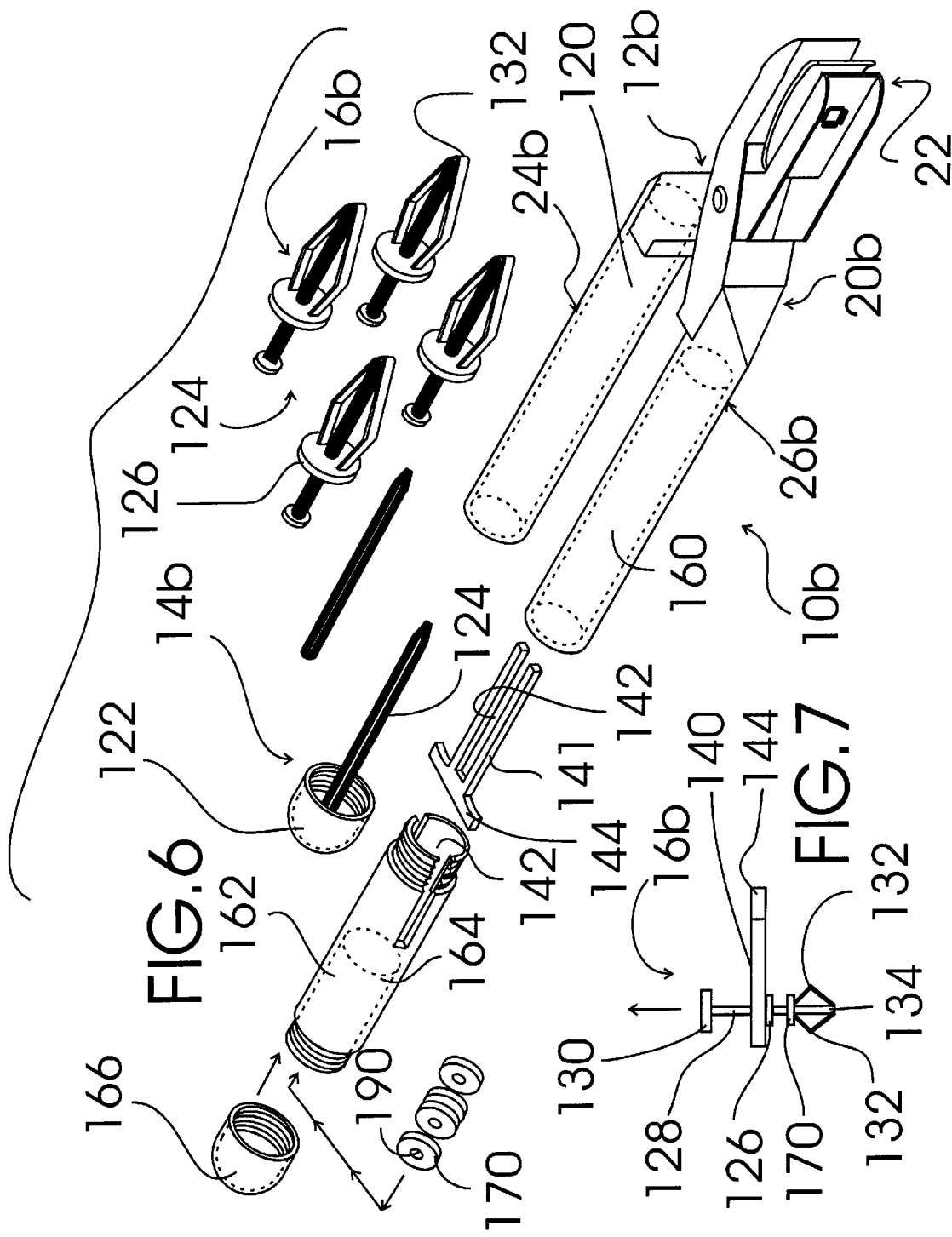

ANIMAL TAGGING SYSTEM

TECHNICAL FIELD

The present invention relates to animal tagging systems and more particularly to an animal tagging system that includes a punch assembly, a pen mechanism and a tag securing assembly; the punch assembly including a spring biased handle assembly in connection with a set of punch jaws for punching hole through an animals ear; the handle assembly including first and second handle ends; the pen mechanism and the tag securing assembly being storable in connection with the handle assembly.

BACKGROUND ART

In many jurisdictions, regulations require that a game animal be immediately tagged once has been slain. Stiff legal penalties can be imposed on hunters who fail to follow these regulations. However, tagging the animal can be difficult because a variety of items are needed to properly fill out and affix the tag. It would be a benefit, therefore, to have animal tagging system that included all of the items necessary to rapidly and correctly fill out and affix the tag to the game animal. Because the tag must be affixed out in the field, it would of course be a further a benefit to have an animal tagging system that was compact and could be carried in a pocket, backpack or the like.

GENERAL SUMMARY DISCUSSION OF INVENTION

It is thus an object of the invention to provide an animal tagging system that includes a punch assembly, a pen mechanism and a tag securing assembly; the punch assembly including a spring biased handle assembly in connection with a set of punch jaws for punching hole through an animals ear; the handle assembly including first and second handle ends; the pen mechanism and the tag securing assembly being storable in connection with the handle assembly.

It is a further object of the invention to provide an animal tagging system that includes a punch assembly, a pen mechanism and a tag securing assembly; the punch assembly including a spring biased handle assembly in connection with a set of punch jaws for punching hole through an animals ear; the handle assembly including first and second handle ends; the pen mechanism and the tag securing assembly being storable in connection with the handle assembly; the first handle end having a pen mechanism having a pen storage cavity formed therein accessible by a first removable handle end cap and sized to receive and hold therein a pen holder having a tubular pen cartridge holding cavity within which a removable pen cartridge with a writing point is removably disposed; the second handle end having tag securing assembly removably provided therein including a line insertion knife having a blade portion attached to a knife handle portion wherein the blade portion includes an edge formed along one side thereof and a line passage aperture formed through the blade adjacent a blade tip end thereof; the knife handle portion forming a portion of the second handle end and including a threaded portion adjacent the blade portion, for securing the knife handle portion in connection with the second handle, and a hollow open opposite end having a securing line spool rotatably installed therein; the securing line spool being filled with tag securing line wound thereon and having an external knob in connection therewith; the hollow open end being sealable with an end cap having a securing line passageway formed therethrough and terminating in an open securing line feed opening through which a free end of the tag securing line is threaded such that the free end extends out of the end cap; the end cap having a line cutting mechanism provided therein.

It is a still further object of the invention to provide an animal tagging system that includes a punch assembly, a pen mechanism and a tag securing assembly; the punch assembly including a spring biased handle assembly in connection with a set of punch jaws for punching hole through an animals ear; the handle assembly including first and second handle ends; the pen mechanism and the tag securing assembly being storable in connection with the handle assembly; the first handle end having a pen mechanism having a pen storage cavity formed therein accessible by a first removable handle end cap and sized to receive and hold therein a pen holder having a tubular pen cartridge holding cavity within which a removable pen cartridge with a writing point is removably disposed; the second handle end having the tag securing assembly removably provided therein including a number of two-part screw faster assemblies and a screw faster assembly drive tool; each of the two-part screw fastener assemblies including a first faster portion having first flange portion in connection between an internally threaded rod portion and an externally threaded screw portion; the screw fastener drive tool having a drive handle attached to a drive shaft portion; the drive handle portion having a hollow chamber formed therein accessible through a removable end cap sized to hold a supply of the two-part screw fastener assemblies; the drive shaft portion being rigidly affixed to the drive handle and terminated in an externally threaded screw head member having a drive flange and a threaded screw end that is companionately threaded to threadably engage the internally threaded rod portion of the first fastener portion.

It is a still further object of the invention to provide an animal tagging system that includes a punch assembly, a pen mechanism and a tag securing assembly; the punch assembly including a spring biased handle assembly in connection with a set of punch jaws for punching hole through an animals ear; the handle assembly including first and second handle ends; the pen mechanism and the tag securing assembly being storable in connection with the handle assembly; the first handle end having a pen mechanism having a pen storage cavity formed therein accessible by a first removable handle end cap having a tubular pen cartridge attached thereto, the pen storage cavity being sized to hold a number of Molly fasteners of the tag securing assembly; each Molly fastener including a top Molly flange frictionally slidably mounted on a nail shaft having a head at a top end and a pair of expandable Mollies attached between the top Molly flange and a bottom end of the nail shaft; the second handle end having the remainder of the tag securing assembly including a removable top Molly flange holding member having a slot formed in a holding end thereof that extends from a handle portion, the slot being sized to receive the shaft of the Molly fastener between the head and the top Molly flange; the holding end being storable in a cavity formed in the second handle end and held in place with a removable securing handle portion; the securing handle portion having a hollow interior cavity accessible through a removable second handle portion cap for holding a number of ear contact flanges that are used in connection with the Molly fasteners by sliding the tip end of the Molly fastener through an aperture formed through the ear contact flange prior to securing the Molly fastener by holding down the top flange and the pulling on head by grasping and pulling with the punch assembly until the two Mollies expand to secure the ear contact flange in place.

Accordingly, an animal tagging system is provided. The animal tagging system includes a punch assembly, a pen mechanism and a tag securing assembly; the punch assembly including a spring biased handle assembly in connection with a set of punch jaws for punching hole through an animals ear; the handle assembly including first and second handle ends; the pen mechanism and the tag securing assembly being storable in connection with the handle assembly.

In a preferred embodiment, the animal tagging system includes a punch assembly, a pen mechanism and a tag securing assembly; the punch assembly including a spring biased handle assembly in connection with a set of punch jaws for punching hole through an animals ear; the handle assembly including first and second handle ends; the pen mechanism and the tag securing assembly being storable in connection with the handle assembly; the first handle end having a pen mechanism having a pen storage cavity formed therein accessible by a first removable handle end cap and sized to receive and hold therein a pen holder having a tubular pen cartridge holding cavity within which a removable pen cartridge with a writing point is removably disposed; the second handle end having tag securing assembly removably provided therein including a line insertion knife having a blade portion attached to a knife handle portion wherein the blade portion includes an edge formed along one side thereof and a line passage aperture formed through the blade adjacent a blade tip end thereof; the knife handle portion forming a portion of the second handle end and including a threaded portion adjacent the blade portion, for securing the knife handle portion in connection with the second handle, and a hollow open opposite end having a securing line spool rotatably installed therein; the securing line spool being filled with tag securing line wound thereon and having an external knob in connection therewith; the hollow open end being sealable with an end cap having a securing line passageway formed therethrough and terminating in an open securing line feed opening through which a free end of the tag securing line is threaded such that the free end extends out of the end cap; the end cap having a line cutting mechanism provided therein.

In another preferred embodiment the animal tagging system includes a punch assembly, a pen mechanism and a tag securing assembly; the punch assembly including a spring biased handle assembly in connection with a set of punch jaws for punching hole through an animals ear; the handle assembly including first and second handle ends; the pen mechanism and the tag securing assembly being storable in connection with the handle assembly; the first handle end having a pen mechanism having a pen storage cavity formed therein accessible by a first removable handle end cap and sized to receive and hold therein a pen holder having a tubular pen cartridge holding cavity within which a removable pen cartridge with a writing point is removably disposed; the second handle end having the tag securing assembly removably provided therein including a number of two-part screw faster assemblies and a screw faster assembly drive tool; each of the two-part screw fastener assemblies including a first faster portion having first flange portion in connection between an internally threaded rod portion and an externally threaded screw portion; the screw fastener drive tool having a drive handle attached to a drive shaft portion; the drive handle portion having a hollow chamber formed therein accessible through a removable end cap sized to hold a supply of the two-part screw fastener assemblies; the drive shaft portion being rigidly affixed to the drive handle and terminated in an externally threaded screw head member having a drive flange and a threaded screw end that is companionately threaded to threadably engage the internally threaded rod portion of the first fastener portion.

In still another preferred embodiment the animal tagging system includes a punch assembly, a pen mechanism and a tag securing assembly; the punch assembly including a spring biased handle assembly in connection with a set of punch jaws for punching hole through an animals ear; the handle assembly including first and second handle ends; the pen mechanism and the tag securing assembly being storable in connection with the handle assembly; the first handle end having a pen mechanism having a pen storage cavity formed therein accessible by a first removable handle end cap having a tubular pen cartridge attached thereto, the pen storage cavity being sized to hold a number of Molly fasteners of the tag securing assembly; each Molly fastener including a top Molly flange frictionally slidably mounted on a nail shaft having a head at a top end and a pair of expandable Mollies attached between the top Molly flange and a bottom end of the nail shaft; the second handle end having the remainder of the tag securing assembly including a removable top Molly flange holding member having a slot formed in a holding end thereof that extends from a handle portion, the slot being sized to receive the shaft of the Molly fastener between the head and the top Molly flange; the holding end being storable in a cavity formed in the second handle end and held in place with a removable securing handle portion; the securing handle portion having a hollow interior cavity accessible through a removable second handle portion cap for holding a number of ear contact flanges that are used in connection with the Molly fasteners by sliding the tip end of the Molly fastener through an aperture formed through the ear contact flange prior to securing the Molly fastener by holding down the top flange and the pulling on head by grasping and pulling with the punch assembly until the two Mollies expand to secure the ear contact flange in place.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 6 is an exploded perspective view of a third exemplary embodiment of the animal tagging system of present invention showing the punch assembly including a spring biased handle assembly in connection with a set of punch jaws; the handle assembly including first and second handle ends; the first handle end having a pen mechanism having a pen storage cavity formed therein accessible by a first removable handle end cap having a tubular pen cartridge attached thereto, the pen storage cavity being sized to hold a number of Molly fasteners of the tag securing assembly; each Molly fastener including a top Molly flange frictionally slidably mounted on a nail shaft having a head at a top end and a pair of expandable Mollies attached between the top Molly flange and a bottom end of the nail shaft; the second handle end having the remainder of the tag securing assembly including a removable top Molly flange holding member having a slot formed in a holding end thereof that extends from a handle portion, the slot being sized to receive the shaft of the Molly fastener between the head and the top Molly flange; the holding end being storable in a cavity formed in the second handle end and held in place with a removable securing handle portion; the securing handle portion having a hollow interior cavity accessible through a removable second handle portion cap for holding a number of ear contact flanges that are used in connection with the Molly fasteners by sliding the tip end of the Molly fastener through an aperture formed through the ear contact flange prior to securing the Molly fastener by holding down the top flange and the pulling on head by grasping and pulling with the punch assembly until the two Mollies expand to secure the ear contact flange in place.

FIG. 7 is a detail side plan view showing the tip end of one of the Molly fasteners positioned through a representative game animal ear and the aperture formed through the ear contact flange and the two Mollies expanded to secure the ear contact flange in place against the backside of the game animal ear.

EXEMPLARY MODE FOR CARRYING OUT THE INVENTION

Figure 1:
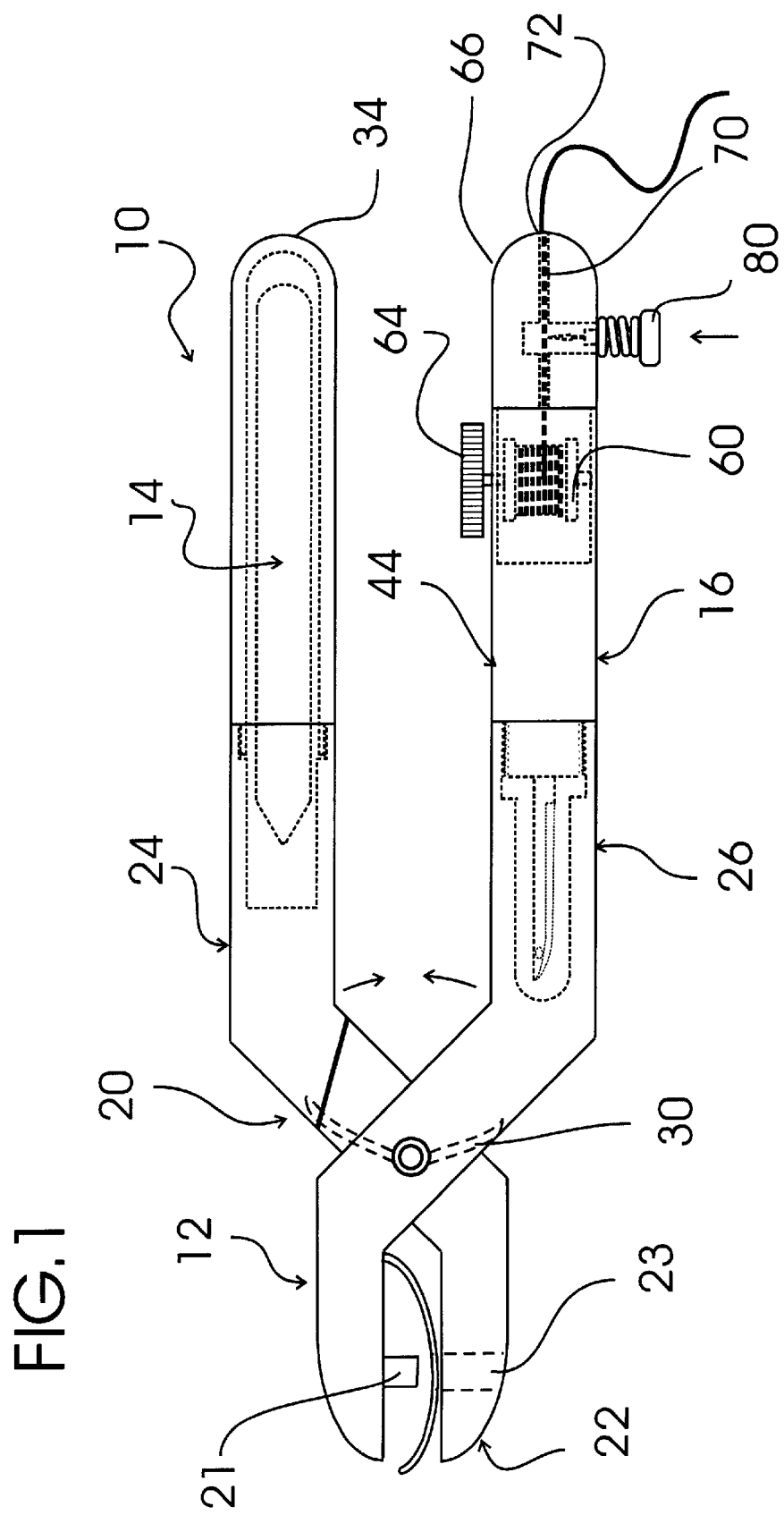
FIG. 1 is a top plan view of an exemplary embodiment of the animal tagging system of the present invention showing the punch assembly including a spring biased handle assembly in connection with a set of punch jaws; the handle assembly including first and second handle ends; the first handle end having a pen mechanism having a pen storage cavity formed therein accessible by a first removable handle end cap and sized to receive and hold therein a pen holder having a tubular pen cartridge holding cavity within which a removable pen cartridge with a writing point is removably disposed; the second handle end having tag securing assembly removably provided therein including a line insertion knife having a blade portion attached to a knife handle portion wherein the blade portion includes an edge formed along one side thereof and a line passage aperture formed through the blade adjacent a blade tip end thereof; the knife handle portion forming a portion of the second handle end and including a threaded portion adjacent the blade portion, for securing the knife handle portion in connection with the second handle, and a hollow open opposite end having a securing line spool rotatably installed therein; the securing line spool being filled with tag securing line wound thereon and having an external knob in connection therewith; the hollow open end being sealable with an end cap having a securing line passageway formed therethrough and terminating in an open securing line feed opening through which a free end of the tag securing line is threaded such that the free end extends out of the end cap; the end cap having a line cutting mechanism provided therein.
Figure 2:
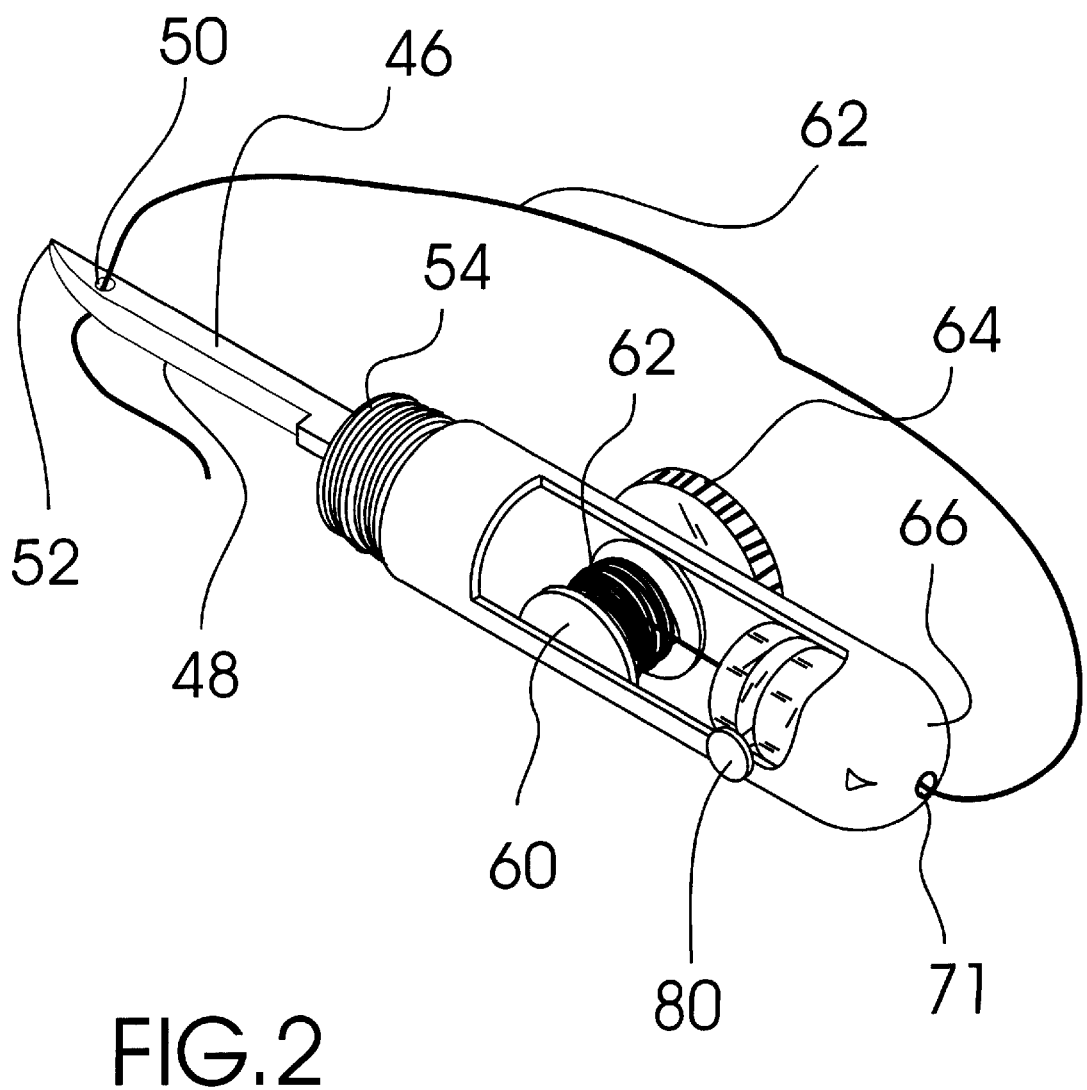
FIG. 2 is a detail partial cutaway view showing the tag securing assembly removed from the second handle end showing the line insertion knife and the end cap secured together.
Figure 3:
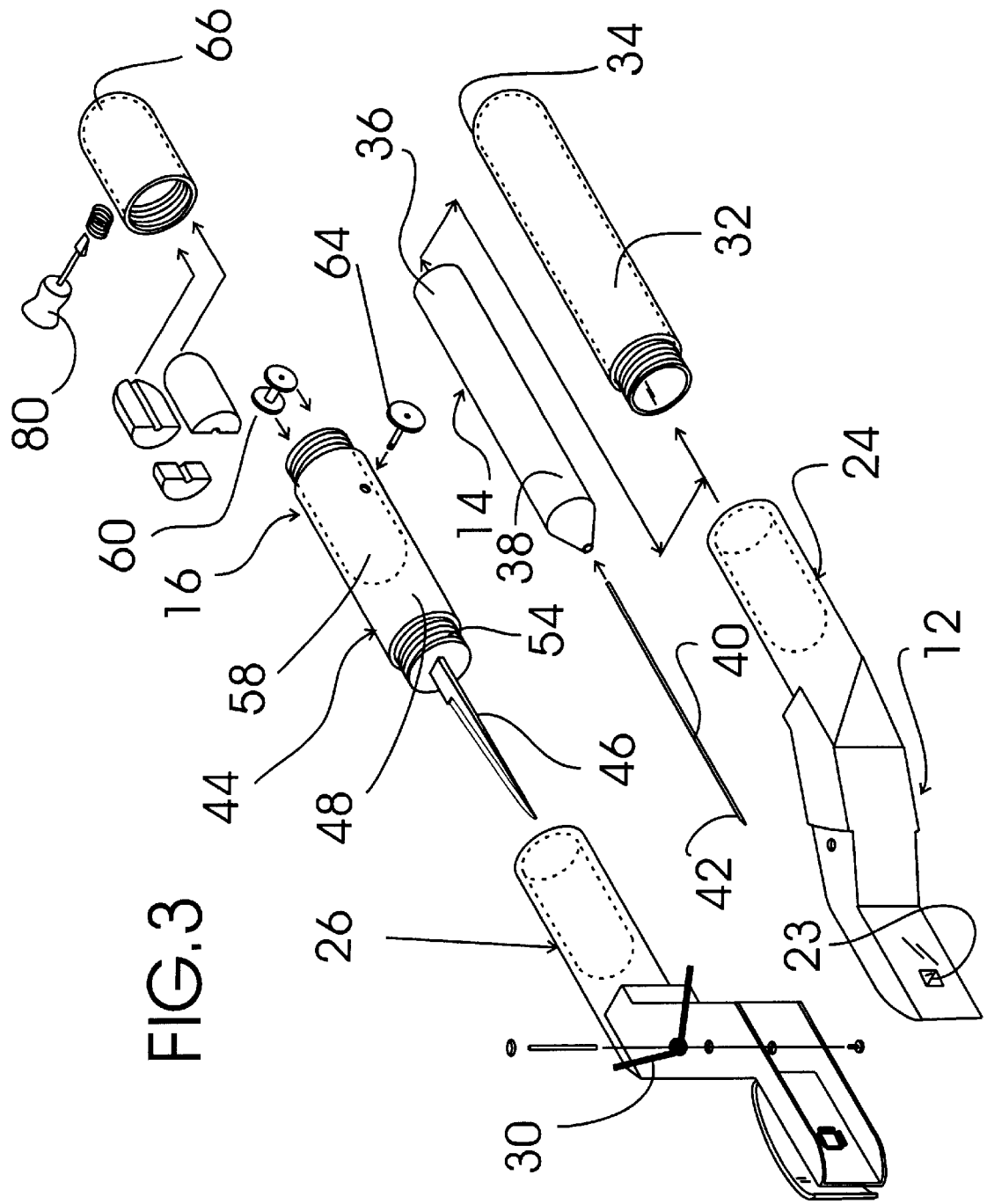
FIG. 3 is an exploded view of the exemplary animal tagging system of FIG. 1.

Referring generally to FIGS. 1–3, FIG. 1 shows a first exemplary embodiment of the animal tagging system of the present invention, generally designated 10, in a fully assembled configuration. Animal tagging system 10 includes a punch assembly, generally designated 12; a pen mechanism, generally designated 14(shown in dashed lines in FIG. 1); and a tag securing assembly, generally designated 16 (shown in dashed lines in FIG. 1).

Punch assembly 12 including a spring biased handle assembly, generally designated 20, in connection with a set of punch jaws, generally designated 22. Punch jaws 22 include a punch pin that is forced through a punch hole 23 (see also FIG. 3) when handle assembly 20 is squeezed together. Handle assembly 20 includes first and second handle ends, generally designated 24,26 that are biased into an open position by a biasing spring 30 (shown in dashed lines FIG. 1).

First handle end 24 has a pen mechanism 14 having a pen storage cavity formed therein accessible by a first removable handle end cap and sized to receive and hold therein a pen holder 36 having a tubular pen cartridge holding cavity 38 (dashed lines FIG. 3) within which a removable pen cartridge 40 with a writing point 42 is removably disposed.

Second handle end 26 has tag securing assembly 16 removably provided therein. Tag securing assembly 16 includes a line insertion knife, generally designated 44, having a blade portion 46 attached to a knife handle portion 48 wherein blade portion 46 includes an edge 48 formed along one side thereof and a line passage aperture 50 formed through the blade adjacent a blade tip end 52 thereof. Knife handle portion 48 forms a portion of the second handle end 26 and includes a threaded portion 54 adjacent the blade portion 46 for securing knife handle portion 48 in connection with second handle 26 and a hollow open end 58 (Dashed lines FIG. 3) having a securing line spool 60 rotatably installed therein. Securing line spool 60 is filled with tag securing line 62 wound thereon and having an external knob 64 in connection therewith. Hollow open end 58 is sealable with an end cap 66 having a securing line passageway 70 formed therethrough and terminating in an open securing line feed opening 72 through which a free end of the tag securing line 62 is threaded such that the free end extends out of end cap 66. End cap 66 has a line cutting mechanism 80 provided therein.

Figure 4:
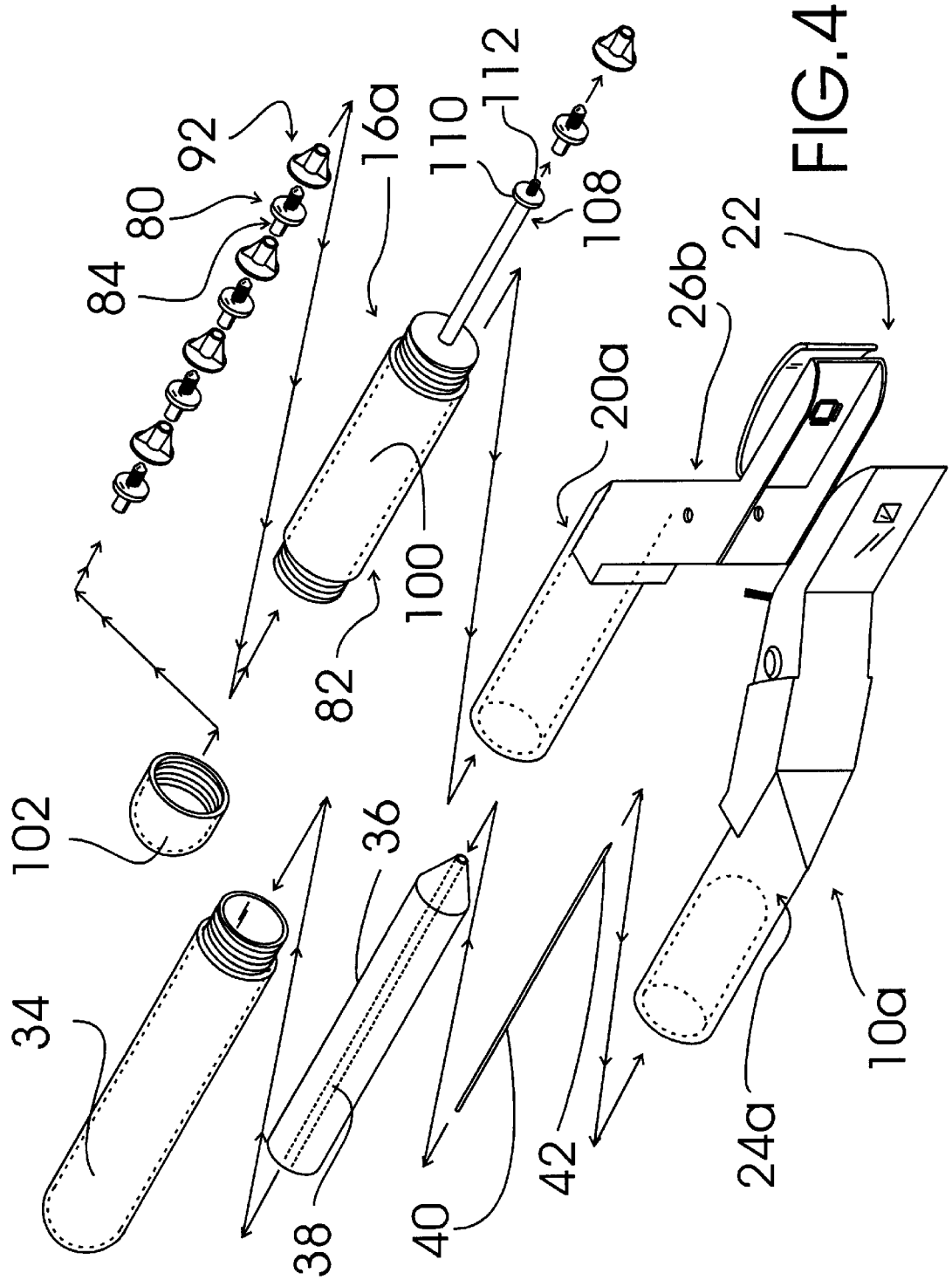
FIG. 4 is an exploded perspective view of a second exemplary embodiment of the animal tagging system of present invention the punch assembly including a spring biased handle assembly in connection with a set of punch jaws; the handle assembly including first and second handle ends; the first handle end having a pen mechanism having a pen storage cavity formed therein accessible by a first removable handle end cap and sized to receive and hold therein a pen holder having a tubular pen cartridge holding cavity within which a removable pen cartridge with a writing point is removably disposed; the second handle end having the tag securing assembly removably provided therein including a number of two-part screw faster assemblies and a screw faster assembly drive tool; each of the two-part screw fastener assemblies including a first faster portion having first flange portion in connection between an internally threaded rod portion and an externally threaded screw portion; the screw fastener drive tool having a drive handle attached to a drive shaft portion; the drive handle portion having a hollow chamber formed therein accessible through a removable end cap sized to hold a supply of the two-part screw fastener assemblies; the drive shaft portion being rigidly affixed to the drive handle and terminated in an externally threaded screw head member having a drive flange and a threaded screw end that is companionately threaded to threadably engage the internally threaded rod portion of the first fastener portion.
Figure 5:
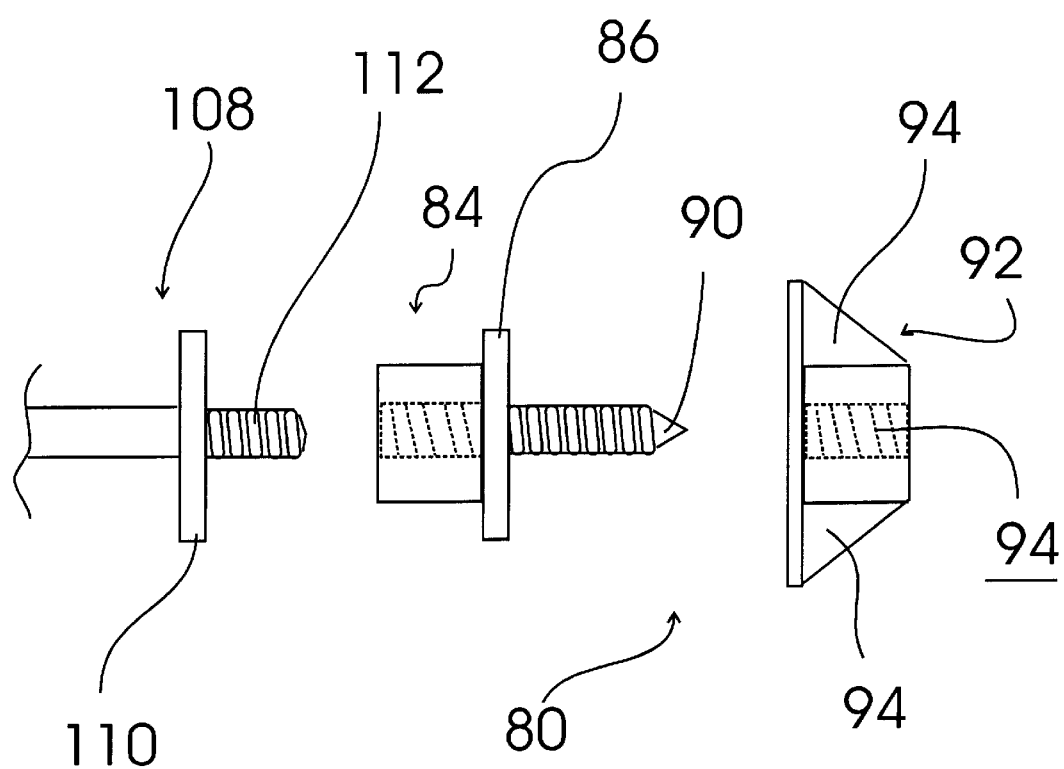
FIG. 5 is an exploded view of one of the two-part screw fastener assemblies and the externally threaded screw head member of the drive shaft portion; the first faster portion having a first flange portion in connection between an internally threaded rod portion and an externally threaded screw portion; the externally threaded screw head member having a drive flange and a threaded screw end that is companionately threaded to threadably engage the internally threaded rod portion of the first fastener portion.

FIGS. 4 and 5, show a second exemplary embodiment of the animal tagging system of the present invention generally designated 10a. Animal tagging system 10a includes a punch assembly 12a that includes a spring biased handle assembly 20a in connection with a set of punch jaws 22 that are identical to those of punch assembly (FIG. 1). Handle assembly 20a includes first and second handle ends 24a,24b. First handle end 24a has a pen storage cavity formed therein accessible by a first removable handle end cap and sized to receive and hold therein a pen holder 36 having a tubular pen cartridge holding cavity 38 (dashed lines) within which a removable pen cartridge 40 with a writing point 42 is removably disposed.

Second handle end 26b has a tag securing assembly, generally designated 16a removably provided therein including a number of two-part screw faster assemblies, generally designated 80 and a screw faster assembly drive tool, generally designated 82. Each of the two-part screw fastener assemblies 80 includes a first faster portion 84 having first flange portion 86 in connection between an internally threaded rod portion 88 and an externally threaded screw portion 90; and a second portion 92 including an internally threaded portion 94 (dashed lines FIG. 5) companionately threaded to engage the threads of threaded screw portion 90 and two opposed external wings 94 to assist a use in griping second part 92 with the fingers or the jaws of punch assembly 12a. Screw fastener drive tool 82 has a drive handle 96 attached to a drive shaft portion 98. Drive handle portion 96 has a hollow chamber 100 (shown in dashed lines) formed therein and accessible through a removable end cap 102. Hollow chamber 100 is sized to hold a supply of the two-part screw fastener assemblies 80. Drive shaft portion 98 is rigidly affixed to drive handle 96 and terminates in an externally threaded screw head member, generally designated 108, having a drive flange 110 and a threaded screw end 112 that is companionately threaded to threadably engage the internally threaded rod portion 88 of first fastener portion 84.

FIGS. 6 and 7 show a third exemplary embodiment of the animal tagging system of present invention, generally designated 10b. Animal tagging system 10b includes a punch assembly, generally designated 12b, including a spring biased handle assembly, generally designated 20b, in connection with a set of punch jaws 22. Handle assembly 20b includes first and second handle ends 24b,26b. First handle end 24b has a pen mechanism, generally designated, and has a pen storage cavity 120 (shown in dashed lines) formed therein accessible by a first removable handle end cap 122 having a tubular pen cartridge 124 rigidly attached thereto. Pen storage cavity 120 is sized to hold a number of Molly fasteners, generally designated 124 of a tag securing assembly, generally designated 16b. Each Molly fastener 124 includes a top Molly flange 126 frictionally slidably mounted on a nail shaft 128 having a head 130 at a top end and a pair of expandable Mollies 132 attached between top Molly flange 126 and a bottom end 134 of nail shaft 128. Second handle end 26b has the remainder of tag securing assembly 16b including a removable top Molly flange holding member 140 having a slot 142 formed in a holding end 141 thereof that extends from a handle portion 144. The slot 142 is sized to receive the nail shaft 128 of a Molly fastener 124 between the head 130 and the top Molly flange 126. Holding end 141 is storable in a cavity 160 formed in the second handle end 26b and held in place with a removable securing handle portion 162. Securing handle portion 162 has a hollow interior cavity 164 (shown in dashed lines, accessible through a removable second handle portion cap 166 for holding a number of ear contact flanges 170 that are used in connection with the Molly fasteners 124 by sliding the tip end 134 of Molly fastener 124 through a hole in an animals ear and then through an aperture 190 formed through ear contact flange 126 prior to securing the Molly fastener 124 by holding down top flange 126 with Molly flange holding member 140 and then pulling on head 130 by grasping and pulling with the fingers or the jaws of punch assembly 10b until the two Mollies 132 expand to secure ear contact flange 170 in place.

It can be seen from the preceding description that an animal tagging system has been provided that includes a punch assembly, a pen mechanism and a tag securing assembly; the punch assembly including a spring biased handle assembly in connection with a set of punch jaws for punching hole through an animals ear; the handle assembly including first and second handle ends; the pen mechanism and the tag securing assembly being storable in connection with the handle assembly.

It is noted that the embodiment of the animal tagging system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An animal tagging system comprising:

a punch assembly;

a pen mechanism; and a tag securing assembly;

said punch assembly including a handle assembly in connection with a set of punch jaws for punching a hole through a section of an animal;

said handle assembly including first and second handle ends;

said pen mechanism and said tag securing assembly being storable in connection with said handle assembly.

2. The animal tagging system of claim 1 wherein:

said first handle end has said pen mechanism therein, said pen mechanism having a pen storage cavity formed therein accessible by a first removable handle end cap and sized to receive and hold therein a pen holder having a tubular pen cartridge holding cavity within which a removable pen cartridge with a writing point is removably disposed;

said second handle end has said tag securing assembly removably provided therein including a line insertion knife having a blade portion attached to a knife handle portion wherein said blade portion includes an edge formed along one side thereof and a line passage aperture formed through said blade adjacent a blade tip end thereof;

said knife handle portion forms a portion of said second handle end and including a threaded portion adjacent said blade portion, for securing said knife handle portion in connection with said second handle, and a hollow open opposite end having a securing line spool rotatably installed therein;

said securing line spool is filled with tag securing line wound thereon and having an external knob in connection therewith; and said hollow open end is sealable with an end cap having a securing line passageway formed therethrough and terminating in an open securing line feed opening through which a free end of said tag securing line is threaded such that said free end extends out of said end cap; said end cap having a line cutting mechanism provided therein.

3. The animal tagging system of claim 1 wherein:

said first handle end has said pen mechanism therein, said pen mechanism having a pen storage cavity formed therein accessible by a first removable handle end cap and sized to receive and hold therein a pen holder having a tubular pen cartridge holding cavity within which a removable pen cartridge with a writing point is removably disposed;

said second handle end has said tag securing assembly removably provided therein including a number of two-part screw faster assemblies and a screw faster assembly drive tool;

each of said two-part screw fastener assemblies including a first faster portion having first flange portion in connection between an internally threaded rod portion and an externally threaded screw portion;

said screw fastener drive tool has a drive handle attached to a drive shaft portion;

said drive handle portion has a hollow chamber formed therein accessible through a removable end cap sized to hold a supply of said two-part screw fastener assemblies;

said drive shaft portion is rigidly affixed to said drive handle and terminated in an externally threaded screw head member having a drive flange and a threaded screw end that is companionately threaded to threadably engage said internally threaded rod portion of said first fastener portion.

4. The animal tagging system of claim 1 wherein:

said first handle end has said pen mechanism therein, said pen mechanism having a pen storage cavity formed therein accessible by a first removable handle end cap having a tubular pen cartridge attached thereto, said pen storage cavity being sized to hold a number of Molly fasteners of said tag securing assembly;

each Molly fastener includes a top Molly flange frictionally slidably mounted on a nail shaft having a head at a top end and a pair of expandable Mollies attached between said top Molly flange and a bottom end of said nail shaft;

said second handle end has a remainder)of said tag securing assembly including a removable top Molly flange holding member having a slot formed in a holding end thereof that extends from a handle portion, said slot being sized to receive said shaft of said Molly fastener between said head and said top Molly flange;

said holding end is storable in a cavity formed in said second handle end and held in place with a removable securing handle portion;

said securing handle portion has a hollow interior cavity accessible through a removable second handle portion cap for holding a number of ear contact flanges that are used in connection with said Molly fasteners by sliding said tip end of said Molly fastener through an aperture formed through said ear contact flange prior to securing said Molly fastener by holding down said top flange and said pulling on head by grasping and pulling with said punch assembly until said two Mollies expand to secure said ear contact flange in place.

* * * * *